G. E. ODELL.
STOCK WATERING DEVICE.
APPLICATION FILED MAY 15, 1908.

922,943.

Patented May 25, 1909.

WITNESSES

INVENTOR
George E. Odell
BY
ATTORNEYS

UNITED STATES PATENT OFFICE.

GEORGE EDMUND ODELL, OF BOWEN, ILLINOIS.

STOCK-WATERING DEVICE.

No. 922,943.  Specification of Letters Patent.  Patented May 25, 1909.

Application filed May 15, 1908. Serial No. 433,020.

*To all whom it may concern:*

Be it known that I, GEORGE EDMUND ODELL, a citizen of the United States, and a resident of Bowen, in the county of Hancock and State of Illinois, have invented a new and Improved Stock-Watering Device, of which the following is a full, clear, and exact description.

This invention relates to certain improvements in stock watering devices, and more particularly that class of such devices which are provided with means for automatically controlling the supply of water thereto; and the object of the invention is to provide a device of this general character, of a simple and comparatively inexpensive nature, and of a strong and durable construction, having a novel and improved arrangement of means for intercepting trash and filth, whereby clogging or interference with the water supply is avoided and cleansing of the device is facilitated.

The device consists in certain novel features of the construction, and combinations and arrangements of the several parts of the improved stock watering device, whereby certain important advantages are attained, and the device is rendered simpler, cheaper and otherwise better adapted and more convenient for use, all as will be hereinafter fully set forth.

The novel features of the invention will be carefully defined in the claims.

Figure 1:
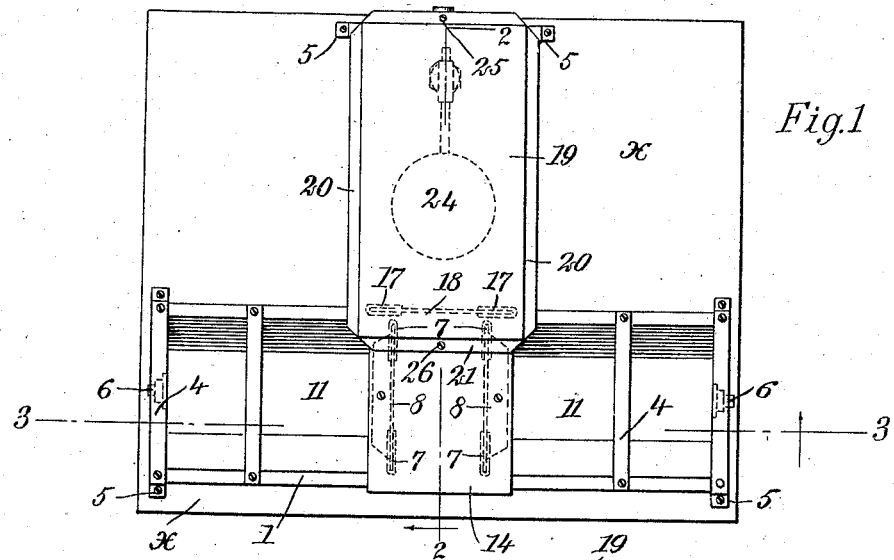
Figure 2:
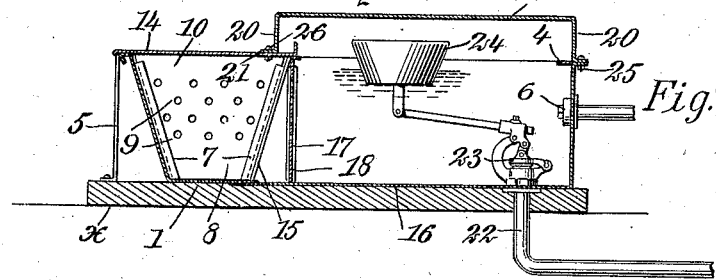

In the accompanying drawings which serve to illustrate the invention Figure 1 is a plan view of a stock watering device embodying my improvements; Fig. 2 is a vertical section taken transversely through the device in the plane indicated by the line 2—2 in Fig. 1; and Fig. 3 is a vertical section taken lengthwise through the improved stock watering device in the plane indicated by the line 3—3 in Fig. 1.

Like characters of reference indicate corresponding parts in all the views.

Figure 3:
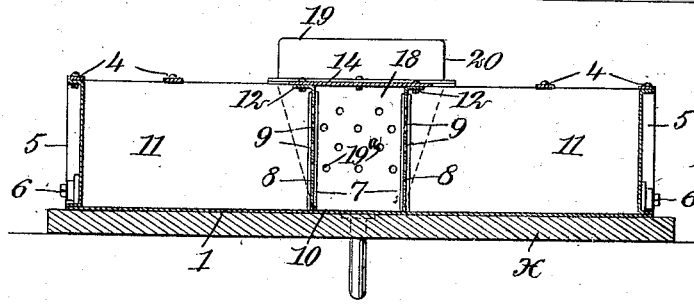

Referring to Figs. 1, 2 and 3, the improved stock watering device constructed according to my invention comprises an elongated trough-like member 1, formed from thin metal, having an open top surrounded by an outwardly turned strengthening flange, and provided at suitable intervals with ties or braces 4, 4, transversely extended across said open top in such a manner as to brace and strengthen said member and permit the employment of thinner metal in the manufacture thereof than would be required were said member not so braced and strengthened. At suitable points along the said trough-like member, certain of said ties or braces 4, 4 are provided with downwardly extended extremities 5, 5 arranged outside of said member and spaced away from the side walls thereof, with their lower ends adapted for connection with a suitable support such, for example, as a platform $x$ whereon the watering device is arranged as shown in the drawings. As herein shown, the ties or braces 4, 4 at the ends of the member 1 are provided with these downwardly bent attaching devices, but it will be evident that similar devices may be located at other points in the length of said member 1 without departure from the invention. The ends of the trough-like member 1 are provided near their lower parts, with drainage apertures, through which sediment or filth collecting in said member may be discharged from time to time. As herein shown, these apertures are closed by means of detachable plugs or stoppers 6, 6, of any preferred kind.

Adjacent to the central part of the elongated trough-like member, the opposite side walls thereof are provided with spaced guideways 7, 7, extended vertically along their inner surfaces, and adapted to receive detachable slides or partitions 8, 8 which are spaced apart from each other to produce a settling chamber or compartment 10 between them, and are similarly spaced apart from the ends of the trough-like member 1 so as to produce drink chambers 11, 11 at the opposite ends of said member 1 and to which the stock has free access by reason of the open top of said trough-like member. The slides or partitions 8, 8 are perforated, as seen at 9, 9, in order to permit the free circulation of water from the settling chamber or compartment 10 to the drink chambers 11, 11, but the lower ends of said slides or partitions 8, 8 adjacent to the bottom of the trough-like member 1, are imperforate so as to effectively prevent the entry of sediment or filth from the drink chambers 11, 11 into said settling chamber or compartment. The slides or partitions 8, 8 have horizontally extended marginal flanges 12, 12, produced along their upper edges as clearly shown in Fig. 3, and said flanges serve for the attachment of a cover plate 14, which is secured at its opposite edges to said flanges and has its central portion extended across the top of the settling chamber or compartment 10, in such a manner as to close the same and thereby prevent the entry of trash or filth into said chamber. The connection of said cover 14 with the slides or partitions is preferably effected as herein shown by detachable fastening means, so as to permit the parts to be disconnected for cleaning or repair, but the construction is such that, if desired, the slides 8 and cover plate 14 may be removed from the trough-like member without being disconnected, the trough-like member having inclined side walls along which the guideways 7, 7 are extended so that but a slight extent of lifting movement of the slides is needful to disengage their edge portions from said guideways when the device is to be repaired or cleansed.

One of the inclined side walls of the trough-like member 1 is cut away at its central part opposite to the settling chamber or compartment 10, as clearly indicated at 15, in Fig. 2, and 16 represents an auxiliary trough-like member, extended at right angles from the central part of said wall of member 1, and having connection with the settling chamber or compartment 10, through the opening 15 produced in said wall of member 1, as above described. The auxiliary member 16 forms a float chamber to which the water supply is admitted by way of a suitable pipe connection such as that indicated at 22, for example, and wherein is located a float 24, movable in unison with variations in the water level in said float chamber, and connected in any preferred manner to operate a valve 23 controlling the supply of water through said pipe 22. As herein shown the pipe 22 is connected with the bottom of the member 16, but it is evident that said pipe may be connected with the end or side of said member as well. The end of said member is herein shown provided with a flushing aperture closed by a removable plug 6, and adapted for use when said member is to be flushed or cleaned. The water supply pipe may, if desired, be connected with this aperture, in which case the opening at the bottom of said member will receive the removable plug and serve as a flushing outlet. The end portion of said auxiliary member 16 has a tie or brace 4 extended across it, with pendent ends 5, adapted for attachment to the support x in order to securely anchor the device in position for use. Adjacent to the connection of the members 1 and 16, the opposite side walls of said auxiliary member 16 have guideways 17, in which are held the edge portions of a partition 18 provided with perforations as shown at 19ª, and serving as a grid or strainer to prevent the entry of trash or impurities from the settling chamber or compartment 10 into the float chamber, in order to effectually prevent clogging or interference with the operation of the water supply controlling means located within the float chamber. This partition or strainer 18 may, if desired, be fixed in position.

19 represents a hood or cover arranged over the float chamber, being provided with a pendent skirt 20, extended around its edge portions and provided with an outwardly directed flange 21 along its lower margin, one end of the flanged skirt 20 being adapted to rest upon the cover plate 14 of the settling chamber or compartment 10, and the remaining portions of said flanged skirt being rested upon the upper edge flange of the auxiliary member 16, as clearly shown in the drawings. At one end of the hood 19, a bolt 25 or equivalent fastening device serves to connect the flanged skirt 20 thereof to the upper edge flange of the member 16, and at the opposite end of said hood 19 a similar bolt 26 serves to detachably hold the hood to the cover plate 14 of the settling chamber or compartment 10. The hood or cover 19 serves to protect the top of the float chamber against the entry of trash or impurities which might clog or interfere with the operation of the water supply controlling means, and said hood or cover being provided with the pendent skirt 20 around its edges, is held at such an elevation above the top of said auxiliary member 16 as to permit free operation of the float 24 therein, so that a maximum level of water may be maintained in the drink chambers 11, 11 when desired. Were the hood or cover flush with the top of the float chamber, it is evident that the upward movement of said float would be limited, and consequently a lower level of water would necessarily have to be maintained in the drink chambers. The hood or cover 19 is capable of being readily removed from the member 16 to afford access to the float chamber for cleaning or repair. On removing the bolt 25, the said hood or cover 19 may be removed from the device, together with the cover plate 14 of the settling chamber, so as to expose both the float and settling chambers. By removing the bolt 26, the hood or cover may be moved pivotally upon the opposite bolt 25, so as to free the cover plate 14 and afford access to both the float and settling chambers.

In the operation of the improved stock watering device, the water admitted by the pipe 22 to the float chamber of the auxiliary member 16 is supplied therefrom through the strainer 18 to the settling chamber or compartment 10, whence said water flows freely into the drink chambers 11, 11 at opposite ends of the trough-like member 1, the perforated slides or partitions 8, 8 and strainer 18 serving to effectively prevent the back flow of trash or filth from the drink chambers into the float chamber, and thereby preventing interruption of the water supply by the collection of impurities in the float chamber.

When the water in the drink chambers 11, 11 shall have attained the desired level, the float valve in the float chamber operates automatically, in a well known way, to cut off the water supply and thereby prevent waste and overflowing of the water from the device. As the level of the water in the drink chambers 11 falls, it is evident that the float valve will operate in the usual way to admit a fresh supply of water.

From the above description of my invention it will be seen that the improved stock watering device is of an extremely simple and comparatively inexpensive construction and is particularly well adapted for use by reason of the facility with which it may be cleansed and repaired, and also by reason of the security with which the water supply controlling means is protected against becoming deranged or clogged by the accumulation of trash and filth in the float chamber; and it will also be obvious from the above description that the device is susceptible of some modification without material departure from the principles and spirit of the invention, and for this reason I do not desire to be understood as limiting myself to the precise construction of the several parts of the device herein set forth in carrying out my invention in practice.

Having thus described my invention, I claim as new and desire to secure by Letters Patent:

1. A device of the character described, comprising a trough-like open-topped member, one wall of which is provided with a central aperture extended from top to bottom thereof, an auxiliary member extended at right angles to said open-topped member and having one end arranged for communication therewith through said central aperture, a hood extended across the top of said auxiliary member, a perforated strainer extended across the auxiliary member adjacent to its connection with the open-topped member, and means, controlled from variations in the water level in said open-topped member, for admitting water to the auxiliary member.

2. A device of the character described, comprising a trough-like open-topped member, spaced perforated partitions extended across the central part of said member and dividing the same into a central settling chamber and drink chambers at opposite ends thereof, a cover plate extended across the central settling chamber, an auxiliary member extended at right angles from one side wall of said open-topped member and having communication with the central settling chamber thereof, a perforated strainer dividing said settling chamber from the interior of the auxiliary member, a hood extended across the top of the auxiliary member, and means, controlled from variations in the water level in said open-topped member, for admitting water to the auxiliary member.

3. A device of the class described, comprising a trough having at each side thereof guideways, and perforated partitions slidable in the guideways and dividing the trough into settling and drink chambers, means controlled by the variations in the water level for admitting water to the settling chamber, said partitions having marginal flanges on their upper edges and a cover plate for the settling chamber secured thereon.

In testimony whereof I have signed my name to this specification in the presence of two subscribing witnesses.

GEORGE EDMUND ODELL.

Witnesses:
 AVA McGILL,
 NETTIE VAN ARTSDALE.